INVENTORS
PHILIP RICHARDSON
JOHN GIBSON

BY Larson and Taylor

ATTORNEYS

INVENTORS
PHILIP RICHARDSON
JOHN GIBSON

BY *Larson and Taylor*

ATTORNEYS

United States Patent Office 3,381,209
Patented Apr. 30, 1968

3,381,209
DYNAMO-ELECTRIC MACHINE HAVING RECTIFIER ASSEMBLY MOUNTED WITHIN ROTARY SHAFT
Philip Richardson, Wylam, and John Gibson, Gateshead, England, assignors to C. A. Parsons & Company, Limited, Newcastle, England, a corporation of Great Britain
Filed Oct. 29, 1964, Ser. No. 407,405
Claims priority, application Great Britain, Oct. 31, 1963, 43,079/63
15 Claims. (Cl. 322—59)

ABSTRACT OF THE DISCLOSURE

An electro-dynamic machine having a rotor winding mounted on a rotary shaft and an A.C. exciter generator coupled to the shaft includes a rectifier assembly, connected between the generator and rotor winding, removably located within the rotary shaft.

This invention relates to dynamo-electric machines and more specifically to synchronous electrical machines of the kind in which a rotor winding of the machine is supplied with "direct" current, this term including rectified current.

In large turbine driven alternating current generators, to which this invention is particularly though not exclusively applicable, the rotor winding is commonly supplied with direct current through slip rings mounted on the rotor from a direct current source which may be either a direct current exciter generator or an alternating current exciter generator with associated rectifiers. As the output of such machines has increased the current loading of the slip rings and brush gear has increased appreciably, and the large number of brushes makes extensive maintenance necessary to ensure satisfactory continuous operation.

Many large generators have been constructed or are under construction in which the second type of rotor supply is used by employing an alternating current exciter generator feeding the rotor winding through stationary rectifiers. The disadvantage of this form of construction is that, as the rectifiers are stationary, it is still necessary to supply the current to the rotor winding through slip rings.

The use of slip rings and brushes has been avoided in some machines of small output by having semi-conductor rectifying elements mounted on a member on the rotor shaft so that they rotate with the shaft. Such a member is usually mounted alongside the exciter generator.

With large machines such as turbo-generators of perhaps 500 megawatt output or more, the number of rectifying elements required is very large, and they occupy considerable space. If they are disposed so that the overall radius of the rectifier assembly is small to keep centrifugal forces to a minimum, the assembly requires a space of substantial axial dimension, and this adds to the length of the machine and increases capital outlay on the buildings housing the machine.

The general object of the present invention is to provide a synchronous electric machine of the kind described in the second paragraph hereof in which the direct current for the rotor winding of the machine is derived from semi-conductor rectifiers but in which any substantial increase in shaft length is avoided.

More specifically it is an object of this invention to provide a synchronous electric machine of the kind described in the second paragraph hereof in which direct current is supplied to a rotor winding of the machine from an assembly of semi-conductor rectifiers supplied with alternating current from an alternating current exciter generator coupled to the shaft of the machine, the rectifier assembly being located inside a hollow portion of the shaft and rotating with the shaft.

It is a further object of this invention to provide a synchronous electric machine in accordance with the preceding paragraph in which a cooling fluid is circulated through ducts in the hollow portion of the shaft to cool the rectifier assembly.

It is a further object of this invention to provide a synchronous electric machine in accordance with either of the preceding two paragraphs in which the rectifier assembly is supported within an enclosing tube.

It is a further object hereof to provide a synchronous electric machine in accordance with the preceding paragraph in which voids in the rectifier assembly are filled with an epoxy resin.

It is still a further object of this invention to provide a synchronous electric machine in accordance with any of the preceding four paragraphs in which conductors of the rectifier assembly carrying alternating current to the rectifiers and conductors of said assembly carrying direct, that is, rectified current from the rectifiers, are arranged on separate annuli within the hollow portion of the shaft, with the individual rectifiers clamped in radial fashion between said two sets of conductors there being two rectifiers or multiples thereof for each phase of the machine.

It is yet a further object hereof to provide a synchronous electric machine in accordance with any of the preceding five paragraphs in which the exciter generator is coupled to the machine shaft at one end of the machine and the direct current output from the rectifier assembly is fed to the rotor winding at the other end of the machine.

Finally, it is an object of this invention to provide a synchronous electric machine in accordance with any of the preceding six paragraphs driven as an alternating current generator.

Other and further objects, advantages and features of the invention will be apparent from the following description of an exemplary embodiment taken in conjunction with the accompanying drawings, wherein.

Figure 1:
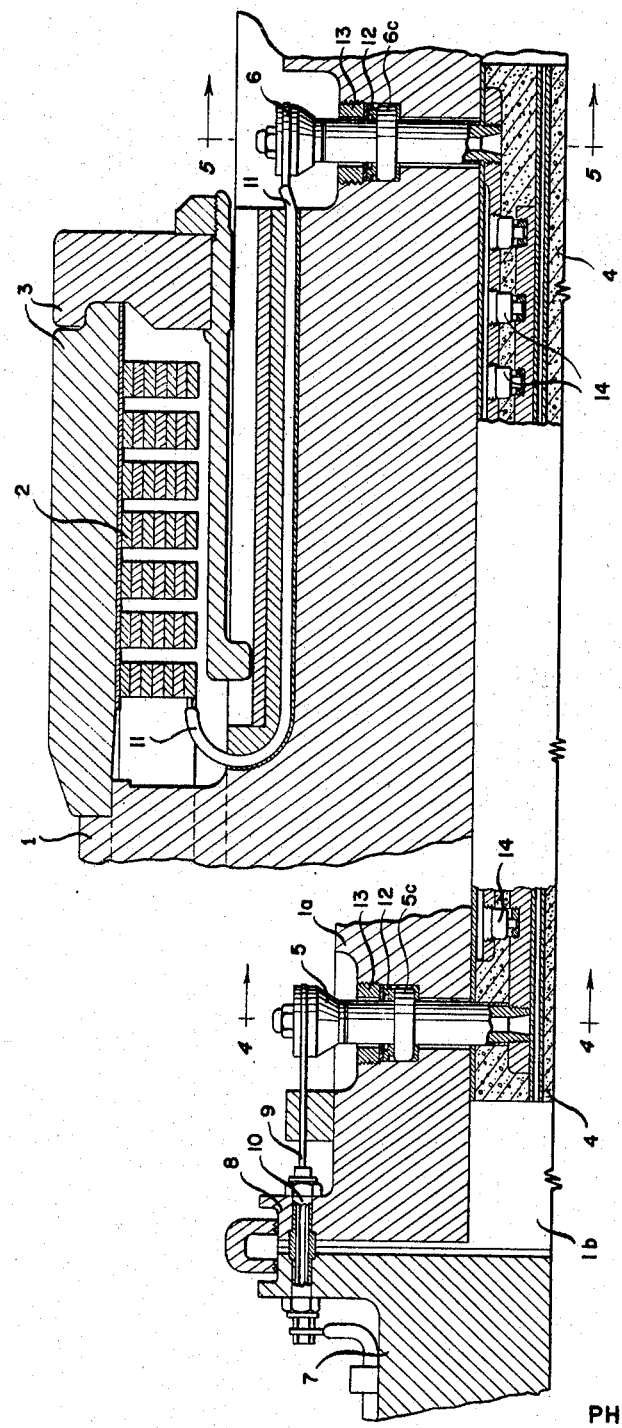
FIGURE 1 is a sectional view of part of a turbo-generator incorporating one embodiment of the present invention.

In carrying the invention into effect in the form illustrated by way of example, and referring first to FIGURE 1, for the sake of clarity certain relevant parts only of the rotor and rotor shaft of a turbo-generator are shown. The rotor 1 incorporates a winding 2, the end parts of which extend beyond the rotor body at each end thereof and are enclosed in end retaining rings 3 of which only one is shown. The rotor shaft at 1a has a bore 1b and located in the bore is a rectifier assembly 4. The rectifier assembly extends, in the form shown, for substantially the whole of the axial length of the rotor body, and radial connectors 5 and 6 respectively connect the assembly to an alternating current exciter generator 7 at one end and to the rotor winding 2 at the other end of the rotor.

The exciter 7 is preferably located between the low pressure end of the turbine and the generator, as connections are thereby simplified and removal of the rectifier assembly from the rotor shaft is facilitated compared with an arrangement in which the exciter is at the end of the generator remote from the turbine. The invention does not, however, preclude the location of the exciter in the latter position should it be desirable under particular circumstances.

The exciter 7 is coupled to the rotor shaft through coupling 8. Leads 9 from connectors 5 pass through coupling bolts 10 to the winding of the exciter.

Figure 5:
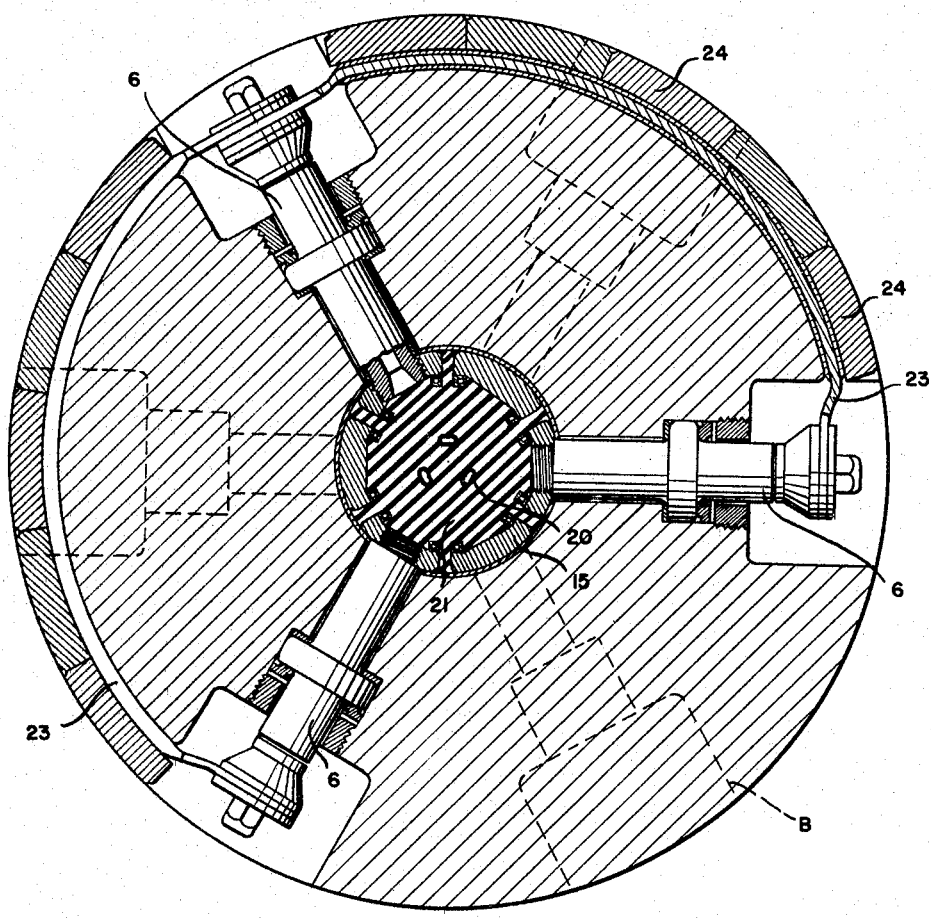
FIGURE 5 is a section through the rotor shaft at lines V—V of FIGURE 1.

The connectors 6 are connected to the rotor winding 2 through leads 11. Referring to FIGURE 5 there are in fact two sets of connectors 6, the sets being displaced from one another in the direction of the axis of the rotor but being disposed close together in the said direction. The connectors of the second set are not visible in FIGURE 1 as they are in different radial planes relative to the set of connectors of which one connector is shown. The mode of connecting the connectors of the second set to the rectifier assembly and to the leads 11 is identical with that used for the first set.

The connectors 5 and 6 are inserted in radial holes in the rotor shaft and have collars 5c and 6c respectively which, in conjunction with washers 12 and plugs 13, serve to lock the connectors in position against centrifugal force. The radially inner ends of the connectors 5 and 6 are screwed into conductors forming part of the rectifier assembly as shown.

Figure 2:
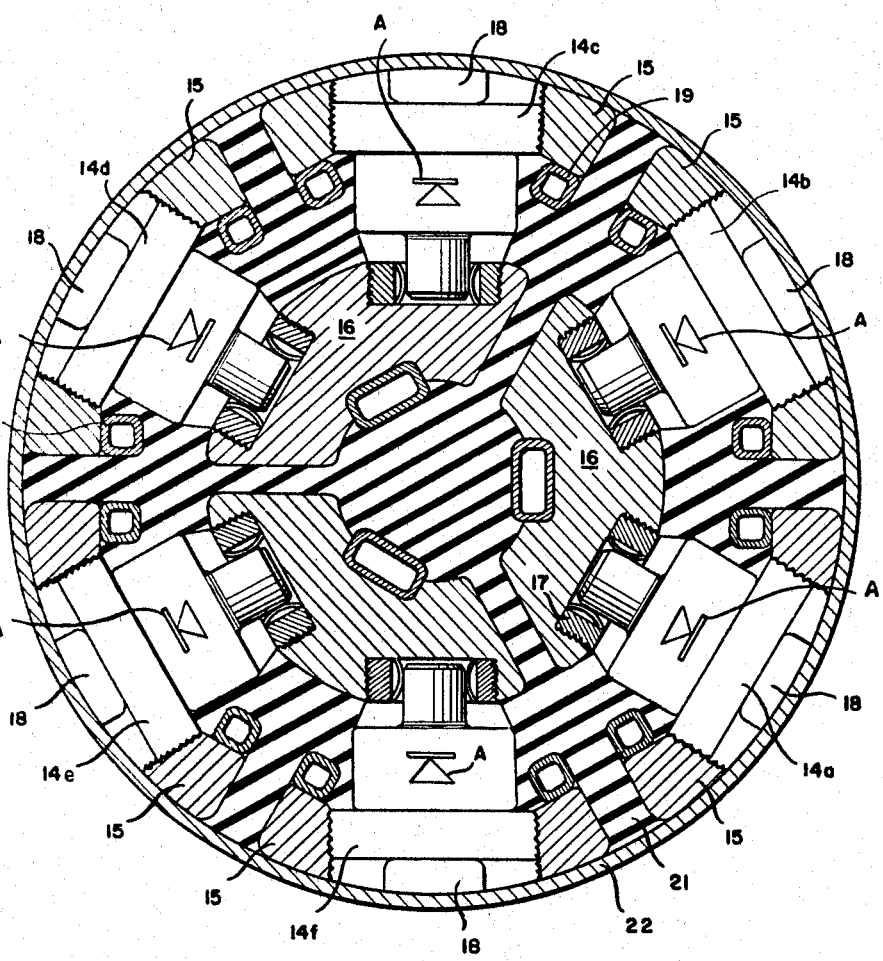
FIGURE 2 is a section through a rectifier assembly for insertion in a hollow portion or bore of the turbo-generator shaft.

Referring now to FIGURE 2 the rectifier assembly comprises a plurality of semi-conductor rectifiers in the form of silicon diodes 14 which are arranged in groups spaced along the axial length of the rotor. In each group there are six diodes disposed radially around the rotor axis. There are two diodes in each group for each phase of the machine, which in the form shown is a three phase machine, diodes 14a and 14b being for one phase, 14c and 14d for a second phase and 14e and 14f for the third phase. One diode associated with a phase has a forward characteristic and the other diode a reverse characteristic as indicated by arrows A on the diodes. The current carrying capacity of a silicon diode is not, at the present stage of development, sufficient to carry the excitation current of a turbo-generator, and it is therefore necessary to arrange several diodes connected in parallel along the length of the shaft as shown in FIGURE 1 where each diode shown is one of a group of six diodes as shown in FIGURE 2.

The diodes are connected by conductors 15 and 16. Conductors 15 are located on an outer annulus and conductors 16 on an inner annulus of the rectifier assembly. Each conductor 15, of which there are six in the form illustrated, is connected to a separate connector 6 whilst each conductor 16, of which there are three in the form shown, is connected to a separate connector 5.

Each of the conductors 16 has two holes each adapted to receive one end of a diode 14, as shown. The diodes are held in position by spring conductors 17.

Each of the conductors 15 has one hole therein adapted to receive one end of a diode 14 as shown.

To cool the assembly the conductors 15 may have longitudinal ducts 18 formed therein and may have additional ducts 19 bonded thereto, a cooling fluid such as water, oil or hydrogen being circulated through the ducts.

Ducts 20 for cooling fluid may also be provided in or attached to conductors 16 as shown. Alternatively ducts may be provided in and attached to conductors 16.

The whole assembly is supported in a solid electrical insulating material 21 such as an epoxy resin and is enclosed in a cylinder 22 also of electrical insulating material such as bakelised paper.

In constructing the assembly the conductors 15 and 16 may initially be held in place by plugs of a material such as polyethene at each diode position and the assembly inserted in cylinder 22. Voids in the assembly are then filled with the insulating material 21 which is allowed to set. The plugs are then removed and the spring connectors 17 placed in the holes in the conductors 16. The silicon diodes 14 are then screwed into place in the assembly. The complete assembly is then inserted in bore 1b of the rotor shaft and the electrical connections to the connectors 5 and 6 are made.

Figure 3:
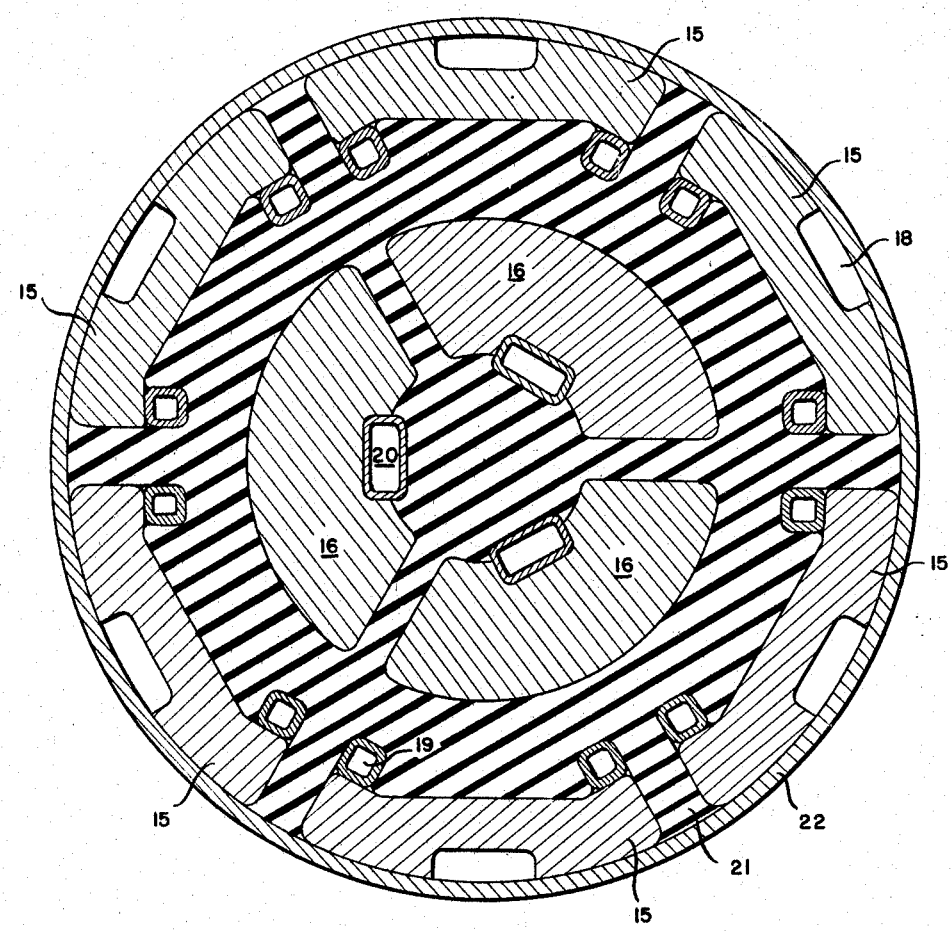
FIGURE 3 is a section through the rectifier assembly at a place between a group of rectifiers.

The shape of the conductors 15 and 16 between groups of rectifiers is shown in FIGURE 3.

Figure 4:
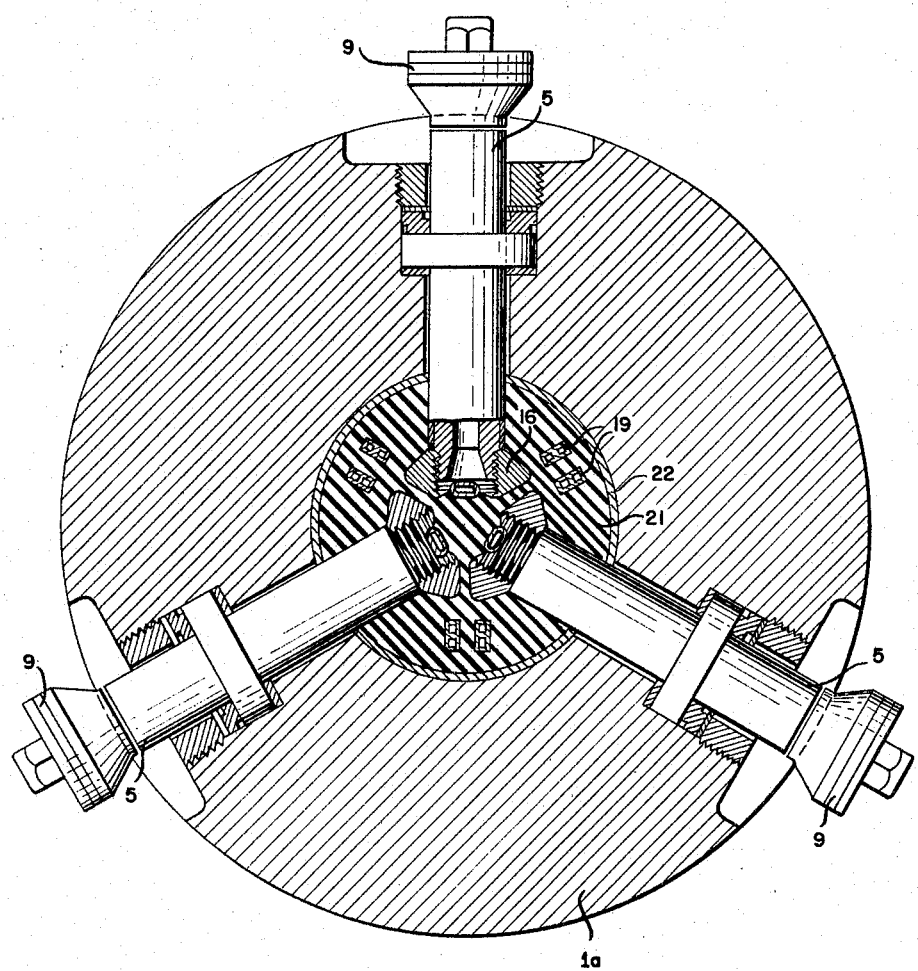
FIGURE 4 is a section through the rotor shaft at lines IV—IV of FIGURE 1.

FIGURE 4 being a section on line IV—IV of FIGURE 1 shows the three connectors 5 connecting the conductors 16 to the leads 9 from the exicter. The cooling ducts 19 of each conductor are brought into position in radial alignment as shown at this part of the shaft so as not to interfere with the connectors 5.

Three of the connectors 6 are shown in FIGURE 5, and the radial holes for the other three connectors which are displaced axially from the set illustrated, are shown in outline by dash lines B. The ends of the connectors 6 are connected by leads 23, and the connectors of the axially displaced set are connected in the same way. The leads 23 are held in position against the action of centrifugal force by wedges 24 which slide in a wedge shaped slot extending around part of the periphery of the rotor shaft.

Figure 6:
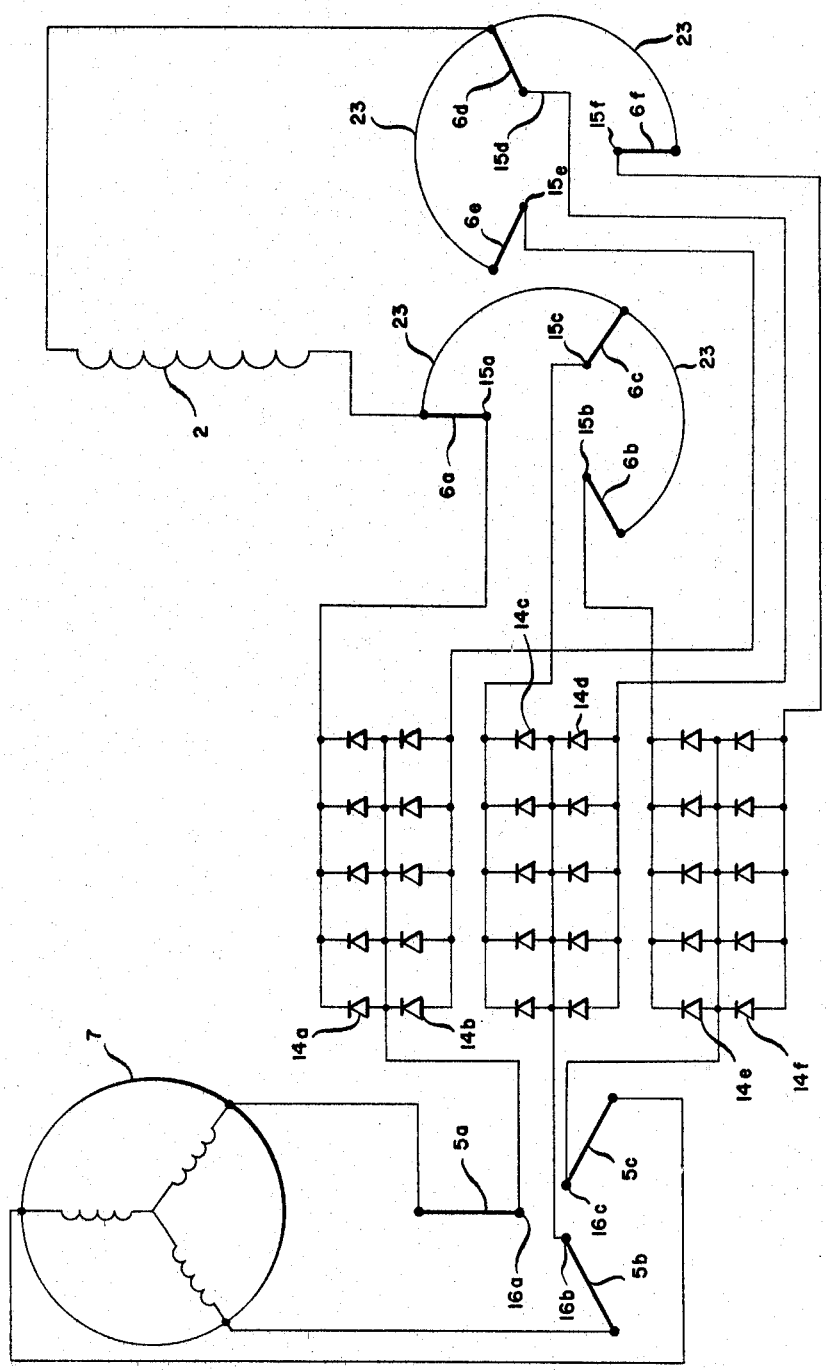
FIGURE 6 is a circuit diagram showing the electrical connections between the rectifier assembly, the exciter and the rotor winding.

The electrical circuit of FIGURE 6 shows the circuit path between exciter, rectifier assembly and rotor winding. The individual conductors 15, 16, diodes 14, connectors 5 and 6, and leads 23 are shown diagrammatically, and the individual components 5, 6, 14, 15 and 16 are given suffixes a, b, c, d, e and f, to assist explanation. Whilst five diodes are shown in parallel in each case this number is given by way of example only. In practice, for a large turbo-generator, many more diodes are connected in parallel for each phase.

If at any instant a current is passing from the exciter 7 through connector 5a, the current path is through connector 5a through conductor 16a through diodes 14a into conductor 15a and thence through connector 6a to the rotor winding 2. The diodes 14c and 14e block any current flow through leads 23 to connectors 6b and 6c. The return path from the rotor winding is through a connector 6d in the set of connectors axially displaced from the set 6a, 6b and 6c, into conductor 15d through diodes 14d to conductor 16b and thence through connector 5b to the exciter. Current can also flow through lead 23 to connector 6f and thence enter conductor 15f from which it flows through diodes 14f to conductor 16c. It then flows back to the exciter through connector 5c. Current cannot flow through lead 23 and through connector 6e at that instant because the electrical potential across diodes 14b is such that they cannot conduct. At a later instant in time current will flow from the exciter to connector 5b and then later to connector 5c, and the above process will be repeated each time although the current paths will change.

With the arrangement described the location of the rectifier assembly in a bore in the rotor shaft reduces centrifugal stress. If the rectifiers are arranged symmetrically around the rotor axis, as described, a substantially zero external magnetic field is produced, thus avoiding difficulties which might arise due to strong magnetic fields whether of a direct or alternating nature.

A large number of rectifiers which may be required to carry the excitation current can be accommodated within the existing rotor shaft, and consequently no increase in axial length of the machine is required to house the rectifier assembly.

The positioning of the rectifier assembly in the rotor shaft also has the advantage that it can be cooled relatively easily by coolant used to cool the machine, for example, water, oil or hydrogen, or coolant from an external source.

The whole rectifier assembly can be removed easily from the end of the shaft so that faulty parts, particularly the diodes, can be released with ease.

In general, in the interest of good current sharing the alternating current input of the assembly is located at the opposite end of the assembly from that of the direct current output, and the exciter is located between the turbine and the generator so that the rectifier assembly can be easily removed from the rotor shaft.

The embodiment shown in the drawings and described herein is merely exemplary of the invention rather than limiting, and the scope of the invention is as defined in the subjoined claims interpreted in the light of the foregoing specification. Having thus described an embodiment of the invention as required by the patent statutes, we claim:

1. Dynamo-electric apparatus, comprising: a synchronous electric machine having a rotor winding and a rotatable shaft supporting said rotor winding, an alternating current exciter generator coupled to said shaft for rotation therewith, said shaft having a hollow portion therein, and semi-conductor rectifier means located in said hollow portion for rotation with said shaft and electrically connected to said exciter generator and to said rotor winding for supplying direct current to said rotor winding from alternating current produced by said exciter generator.

2. Apparatus as set forth in claim 1 wherein said semi-conductor rectifier means comprises an integral assembly removable as a body from said hollow portion in said shaft.

3. Apparatus as set forth in claim 2 wherein said assembly comprises a tube-like member enclosing a plurality of semi-conductor rectifiers and conductors for carrying current to and from said rectifiers, and an epoxy resin filling the voids in said tube.

4. Apparatus as set forth in claim 3 wherein said conductors in said tube-like member are arranged on radially spaced annuli therein, and the individual rectifiers extend radially between spaced conductors.

5. Apparatus as set forth in claim 1 further comprising a plurality of hollow ducts in the hollow portion of said shaft for conducting cooling fluid therethrough to cool said semi-conductor rectifier means.

6. In a synchronous electric machine having a rotor winding mounted on a rotary shaft, and an alternating current exciter generator coupled to the shaft, the improvement comprising: a hollow portion in said shaft, rectifier means mounted in said hollow portion for rotation with said shaft, means electrically connecting said exciter generator to said rectifier means to supply alternating current to said rectifier means, and means electrically connecting said rectifier means to said rotor winding to supply direct current thereto.

7. Apparatus as set forth in claim 6 further comprising a plurality of ducts extending through said hollow portion in the vicinity of said rectifier means for circulating cooling fluid to cool said rectifier means.

8. Apparatus as set forth in claim 6 wherein said rectifier means comprises an integral assembly of semi-conductor rectifiers and conductors insertable into and removable from said hollow portion as a unitary body.

9. Apparatus as set forth in claim 6 wherein said rectifier means comprises a plurality of semi-conductor rectifiers, conductors joining said rectifiers, and a casing in which said rectifiers and said conductors are enclosed, said casing being removably disposed in said hollow portion for rotation with said shaft.

10. Apparatus as set forth in claim 9 wherein the voids in said casing are filled with an epoxy resin.

11. Apparatus as set forth in claim 9 in which first ones of said conductors in said casing carry alternating current to said rectifiers and second ones of said conductors carry direct current from said rectifiers, said first and second conductors being spaced from each other in said casing, and wherein said rectifiers are clamped between said spaced conductors.

12. Apparatus as set forth in claim 9 wherein said electrical connecting means comprise connecting members extending through openings in said rotary shaft, and wherein said casing has openings therein for receiving said connecting means so as to connect them to appropriate ones of said conductors.

13. Apparatus as set forth in claim 6 wherein said exciter generator is coupled to said shaft at one end of the machine, and the direct current output from said rectifier means is fed to said rotor winding at the other end of the machine.

14. Apparatus as set forth in claim 1 wherein said rectifier means comprises a plurality of individual semi-conductor rectifiers extending radially outward from the axis of said shaft.

15. Apparatus as set forth in claim 6 wherein said rectifier means comprises a plurality of individual rectifier elements, conductors for carrying current to and from said rectifiers, and means for mounting said conductors in a spaced relationship, said individual rectifier elements extending radially between said spaced conductors outwardly of the axis of said shaft.

References Cited
UNITED STATES PATENTS

| | | | |
|---|---|---|---|
| 3,059,168 | 10/1962 | Sones et al. | 322—59 |
| 3,078,409 | 2/1963 | Bertsche et al. | 321—8 |
| 2,283,219 | 11/1966 | Keady | 317—234 |

MILTON O. HIRSHFIELD, *Primary Examiner.*

R. V. LUPO, *Assistant Examiner.*